Jan. 28, 1964    J. L. MOSSEY    3,119,468
BRAKE HAVING ANCHORING MEANS FOR PRODUCING
UNIFORM WEAR OF FRICTION MEMBER
Filed Jan. 4, 1960    2 Sheets-Sheet 2

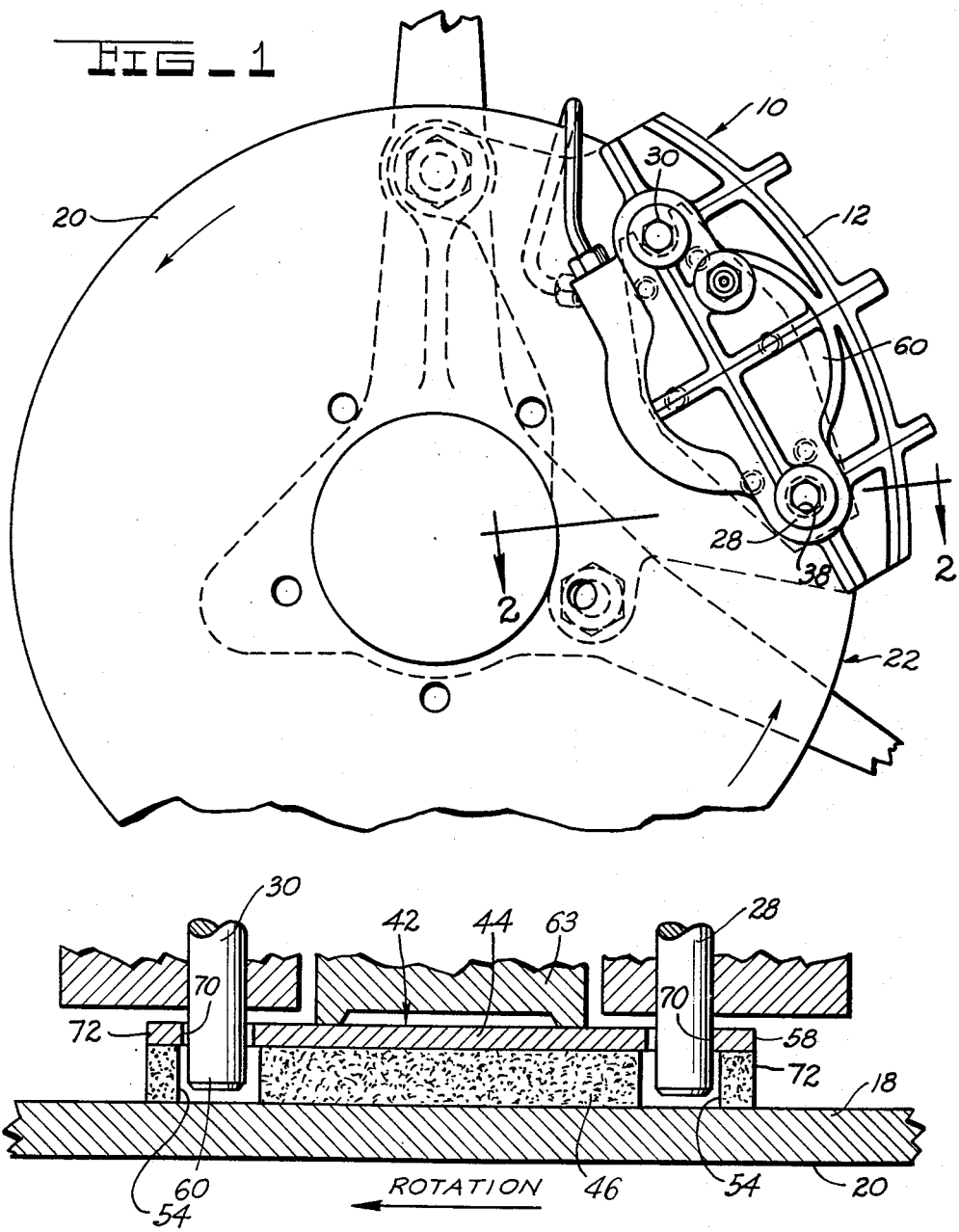

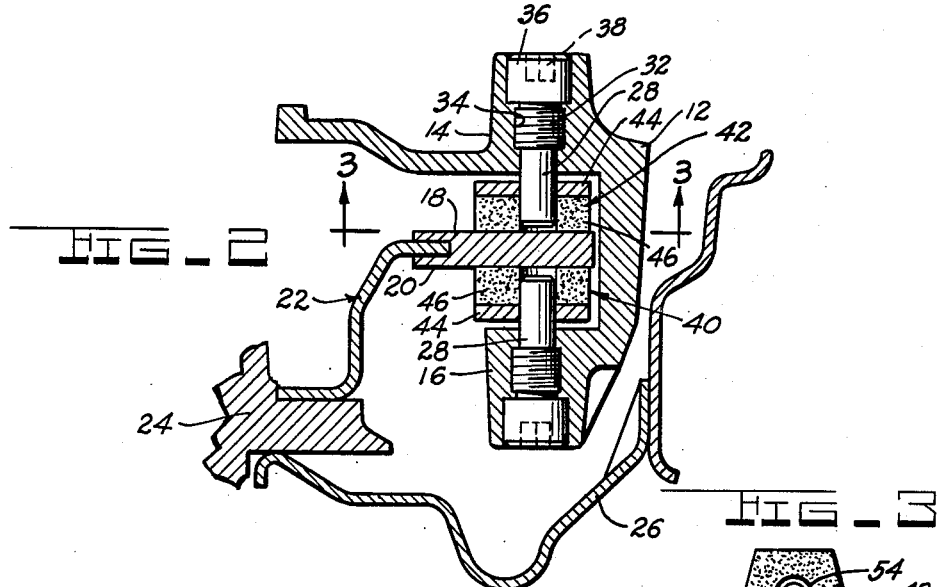

P = APPLYING FORCE..
N = NORMAL FORCE OF ROTOR ON LINING..
$\mu_1$ = COEFF.' OF FRICTION BETWEEN -
    ROTOR AND LINING..
$F_A$ = ANCHORING FORCE, TRAILING SHOE
$\mu_2$ = COEFF.' OF FRICTION BETWEEN -
    ANCHOR AND SHOE..
e = OFFSET OF NORMAL FORCE
    FROM APPLYING FORCE..
$F'_A$ = ANCHORING FORCE, LEADING SHOE..

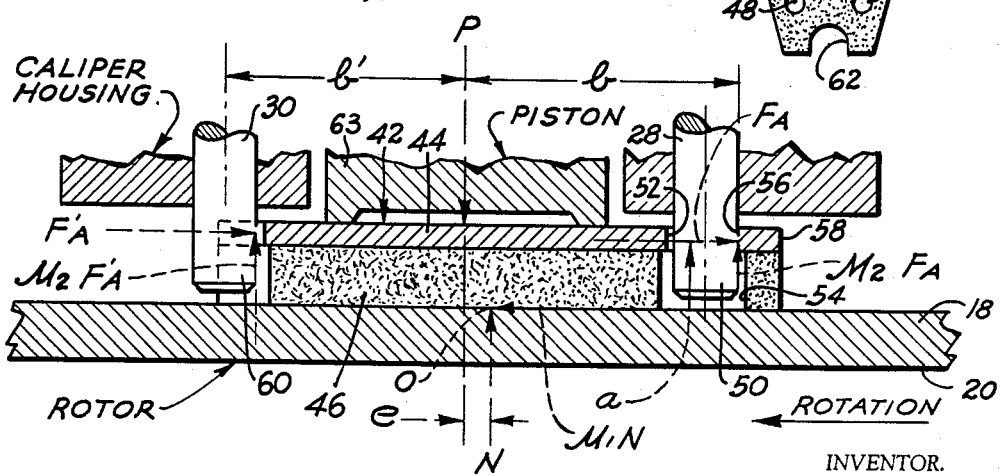

INVENTOR.
JOSEPH L. MOSSEY.
BY John A. Young
ATTORNEY.

United States Patent Office 3,119,468
Patented Jan. 28, 1964

3,119,468
BRAKE HAVING ANCHORING MEANS FOR PRODUCING UNIFORM WEAR OF FRICTION MEMBER
Joseph Lloyd Mossey, South Bend, Ind., assignor to The Bendix Corporation, a corporation of Delaware
Filed Jan. 4, 1960, Ser. No. 390
8 Claims. (Cl. 188—73)

This invention relates to brakes having laterally applied friction members, i.e. those which are actuated along a line parallel to the axis of rotation of the rotor to effect frictional retarding action on the rotor. More particularly, the invention relates to a novel anchoring arrangement of a friction member.

A substantial problem with brakes of the character described is that the friction members tend to wear unequally because of their tendency to twist about the coacting anchoring surface thus introducing a turning force which produces unequal applying pressure between various points of the friction member and its opposed rotor surface. The unequal lining wear detracts from the useful wear life of the friction member since it must be replaced when any portion of the lining segment has become completely or appreciably abraded.

One proposal has been to vary the shape of the liner segment so that the portion under higher pressure has a proportionately greater amount of friction material, the idea being to balance the inequality of pressure against a proportionate amount of lining. Another proposal has been to offset the location of input or applying force with respect to the geometrical center of the friction segment in order to cause greater input pressure against those areas of the liner segment which tend to be relieved by twisting of the friction member on its anchoring surface. While the arrangements set forth above have substantial merit, there is proposed in the present invention an even simpler and surprisingly effective remedy of the problem.

It has been found, and it will be mathematically substantiated, that by anchoring the friction member at its end offset from the geometric center in the direction opposite to at least one direction of rotor rotation, the turning or twisting effect of the friction member on its anchoring surface can be effectively compensated during braking when the rotor is rotating in said one direction. This anchoring arrangement assists in providing equal wear of a friction member from one remote lateral or angular end to the other.

One of the objects of this invention is to provide a disk brake with "trailing shoe" braking during at least one direction of rotor rotation.

Another object of this invention is to provide a disk brake with "trailing shoe" braking during at least one direction of rotor rotation, which braking will assist in equal wear of either a symmetrical or asymmetrical friction member from one remote lateral or angular end to the other remote lateral or angular end thereof.

A further object of the invention is to effect equalized wear from one end to the other of the friction segment by means of a novel anchoring arrangement which provides for approximate alignment of an actuator input pressure and the opposed normal force from the rotor which reacts against the friction member.

Other objects and features of the invention will become apparent from a consideration of the following description wherein a selected example embodiment has been chosen to illustrate the invention. The description proceeds with reference to the accompanying drawings, wherein:

FIGURE 1 is a side elevation view of the brake and rotor;

FIGURE 2 is a sectional view taken on line 2—2 of FIGURE 1;

FIGURE 3 is a detailed view of the friction member which is detached from the brake;

FIGURE 4 is a force analysis of the actuating and braking forces which occur during braking, this being a sectional view taken through the length of the friction member and illustrating the anchors, actuator and opposed rotor; and FIGURE 5 is a section view similar to FIGURE 4 but with a somewhat different arrangement of the anchoring structure.

The brake which is shown generally in FIGURE 1, and is designated generally by reference numeral 10 is generally known in the art as a "caliper" brake. The brake comprises a cast housing 12 having limbs 14 and 16 which are axially spaced apart to receive the annular braking surfaces 18 and 20 of rotor 22 therebetween.

The rotor 22 is secured to a wheel hub 24 (FIGURE 2) and the wheel 26 is likewise suitably secured to the hub 24.

Each caliper limb 14, 16 has two spaced bolts 28 and 30, each bolt having a threaded portion 32 which is screwed into threaded opening 34 in the caliper limb to adjust the clearance at the end of the bolt 28 from its adjacent rotor braking surface. The bolt 28 may be turned at its head 36 by some convenient tool which fits within socket 38.

The identically constructed friction members 40 and 42 are mounted one on each side of the rotor to be engageable with annular surfaces 18 and 20 of the rotor, and each friction member may be either symmetrically constructed about an axis taken through a medial longitudinal axis of the friction member or be asymmetrical. The friction member comprises an inflexible backing 44 and a segment 46 of friction material lining of suitable composition. As shown in FIGURE 3, the lining segment 46 may be secured by rivets 48 to the backing but this is only for purposes of illustration since bonding is equally suitable in many applications. The end 50 of bolt 28 (FIGURE 4) extends through an opening 52 of backing 44 and within opening 54 in the lining segment 46 to provide a slidable bearing anchoring surface 56 for the segment 42 at its one angular remote end 58, this being the end of the friction segment which is known as the "advance" end of the friction segment since it is the first portion contacted by the rotor as it enters the housing.

The anchoring surface 56 provides the sole anchoring surface for the friction member 42 during rotation of the rotor in the direction indicated in FIGURES 1 and 4, this corresponding to forward vehicle movement, and the opening 52 is proportioned relatively to the size of the bolt 28 to permit free slidable movement on the bearing surface 56 so that the friction member 46 can be moved freely toward and away from engagement with its opposed rotor surface. The other bolt 30 has an end 60 which passes through a notch 62 at the end of the friction segment remote from its anchoring end, to assist in mounting the friction member 42 and prevent its rotation about the anchor 28.

To actuate the brake there is a fluid motor housing 60 on each caliper limb 16, 18 and each housing contains a fluid pressure responsive piston 63 which is in abutment with the backing 44 of the respective friction members 40, 42. Details of the construction of mounting the housing and the method whereby the piston 63 may be made to tilt slightly so as to conform with the movement of the friction member are set forth in Patent No. 2,994,410, issued August 1, 1961 (common assignee).

One of the substantial problems with the caliper type brake is that the friction lining 46 tends to wear unevenly across the face of the friction member from its "advance" end to the opposite end, the general occurrence being that the lining wears more rapidly at the "advance" end because the tangential friction forces develop a twisting movement on the friction member about its anchor tending to unequalize the normal force of engagement between the friction material segment 46 and its opposed braking surface of the rotor.

This problem is overcome in the present invention by providing what is called "trailing shoe" braking; that is, the applying force from the piston 63 develops a moment arm which is opposed to the twisting force on the friction segment from the wiping action of the rotor tending to turn the friction member on its anchor.

That such is the case can be made clear from a consideration of the force diagram in FIGURE 4 wherein the applying force can be considered as located along the line "P" which is located a distance "$b$" from the anchoring surface 56. The tangential wiping force from frictional engagement of the lining segment 46 is represented by the symbol $\mu_1 N$ which is the distance "$a$" from the anchoring surface 56. These two forces "P" and $\mu_1 N$ acting through their respective lever arms "$b$" and "$a$" produce opposed moments and therefore by definition, the brake is a "trailing shoe" brake; i.e. the input applying force is opposed to the frictional braking force in their respective development of moments about the anchoring surface.

The use of a "trailing brake shoe" enables the friction lining segment to wear evenly from one end to the other end thereof. Proof of this is illustrated by the following mathematical analysis wherein: P refers to the input applying force; N designates the normal reaction force from the rotor; $\mu_1 N$ is the braking force or frictional retarding force between the segment 46 and rotor surface 18; $\mu_1$ being the coefficient of friction; $F_a$ is the anchoring force; $\mu_2 F_a$ represents the resistance to lateral sliding movement of the friction member, the coefficient of friction between anchor 28 and surface 26 being $\mu_2$; and the distances "$a$," "$b$" and "$e$" represent the distances shown in FIGURE 4.

(1) $\qquad \Sigma_y = 0$ or, the summation of vertical forces in FIGURE 4 is equal to zero Then, (2) $\qquad P - N - \mu_2 F_a = 0$ from which (3) $\qquad \mu_2 F_a - P = N$ also (4) $\qquad \Sigma F_x = 0$ or, the summation of horizontal force in FIGURE 4 is equal to zero, and therefore (5) $\qquad F_a - \mu_1 N = 0$ from which (6) $\qquad N = F_a / \mu_1$ Since the braking system is a balanced one we can assume that a summation of moments about any point is equal to zero, and taking for convenience the point which is the intersection of N and the upper surface 18 of the rotor, we have:

(7) $\qquad \Sigma M_0 = 0$ therefore (8) $\qquad a F_a - eP - (b - e)\mu_2 F_a = 0$ from which, we have in solving for "$e$"

(9) $$e = \frac{F_a(a - b\mu_2)}{P - \mu_2 F_a}$$

and, combining (3) and (9)

(10) $$e = \frac{F_a(a - b\mu_2)}{P - (P - N)}$$

or

(11) $$e = \frac{F_a(a - b\mu_2)}{N}$$

and combining (6) and (11)

(12) $$e = \frac{F_a(a - b\mu_2)}{F_a/\mu_1}$$

(13) $\qquad e = \mu_1(a - b\mu_2)$

If actual values are taken for the quantities $a$, $b$, $\mu_1$ and $\mu_2$ such as $a = .53''$, $b = 2.16''$, $\mu_1 = .4$, $\mu_2 = .2$ (these being typical values) and in solving for the value of $e$, it will be seen that $e = .0392$. From Equation 13, it will be seen that as the distance "$a$" decreases with lining wear, the amount of offset "$e$" will shift successively closer to a point of coincidence with P and will gradually reverse in value from positive (displacement to the right of "P") to negative (displacement to the left of "P"). During the total wear life of the lining, whatever small offset occurs initially will decrease and then become a negative value.

A similar analysis may be made of "leading" shoe braking in which the twisting of the friction member on its anchor is complemented by the input force. In this instance the friction member 42 anchors on bolt 30 in the direction of rotor rotation shown in FIGURE 4. Using the same values as provided in the trailing shoe braking analysis, it can be easily demonstrated that lining wear is not equalized. In "leading" shoe braking analysis, the symbols "P" and "N" refer to the same forces as before; the coefficient of friction $\mu_1$ remains the same; "$e$" refers to the amount of offset between the input pressure P and its opposed normal force N; "$b'$" is the perpendicular distance from the line of force of P and the anchoring surface provided by bolt 30; $F_a'$ is the anchoring load of the friction member 42 against bolt 30; $\mu_2$ is the coefficient of sliding friction at the bearing surface of the anchor bolt 30; and the distance "$a$" is the same geometrical distance as used before in trailing shoe braking. This mathematical analysis is as follows:

(1) $\qquad \Sigma F_y = 0$ meaning that the summation of vertical forces in FIGURE 4 is balanced. Therefore, (2) $\qquad P - N - \mu_2 F_a' = 0$
(3) $\qquad \mu_2 F_a' = P - N$
(4) $\qquad \Sigma F_x = 0$ meaning that summation of horizontal forces in FIGURE 4 is also balanced. Therefore, (5) $\qquad F_a' - \mu_1 = 0$ from which (6) $\qquad N = F_a'/\mu_1$
(7) $\qquad \Sigma M_0 = 0$ taking the intersection of N and $\mu_1 N$ as the center of moments; therefore (8) $\qquad a F_a' + (b' + e)\mu_2 F_a' - eP = 0$ from which (9) $$e = \frac{F_a'(a + b'\mu_2)}{P - \mu_2 F_a'}$$

combining (3) and (9)

(10) $$e = \frac{F_a'(a + b'\mu_2)}{P - (P - N)}$$

or

(11) $$e = \frac{F_a'(a + b' \ )}{N}$$

combining (6) and (11)

(12) $$e = \frac{F_a'(a+b'\mu_2)}{F_a'/\mu_1}$$

from which

(13) $$e = \mu_1(a+b'\mu_2)$$

If we apply the same values for $a$, $\mu_1$ and $\mu_2$ as applied for the analysis of the trailing shoe braking and further assume the value of $b'$ as being 1.66″ then the calculated value of $e$ is .3448, almost ten times larger than the amount of offset than with trailing shoe braking effected by using anchor 28. Continued braking wear will not serve to change the value of "$e$" from positive to negative.

The rule is that the wear rate of friction segments is most nearly of equal balance from one end to the other when the input pressure "P" is most nearly coincident with the opposed reaction force "N" from the rotor. Since the offset "$e$" between the input force P and the reaction force N is much smaller for a "trailing shoe" brake than the offset "$e$" for a "leading shoe" brake, there will be more equal wear of the lining of the "trailing shoe" brake than the lining of the "leading shoe" brake. Furthermore, the changing of "$e$" to a negative value from a positive value for the "trailing shoe" brake is an additional factor for effecting equal lining wear throughout its entire wear life which is not present in the "leading shoe" brake.

In another embodiment of the invention, openings 70 at the opposite ends 72 of the friction member are made oversize relatively to the diameter of bolts 28 and 30 so that in each direction of braking, the friction member is restrained against rotation by contact of its opening at the advance end of the friction member to provide trailing shoe braking in both forward and reverse rotor rotation. Thus, in place of slot 62 in the previous embodiment there is an opening of the same size as opening 70 providing an anchoring surface engageable with bolt 30 during reverse rotor rotation. This additional embodiment thereby provides the advantages of trailing shoe braking for each direction of rotor rotation corresponding to forward and reverse vehicle movement.

Although the present invention has been explained with reference to certain selected embodiments as the best working examples of the invention, it will be understood that these are only illustrative and in no sense restrictive of the invention. It is to be expected that those skilled in the art can make numerous adaptations and revisions of the invention as suits specific design requirements, and it is intended that such revision and variations as incorporate the herein disclosed principles will be included within the scope of the following claims as equivalents of the invention.

I claim:

1. A brake comprising a rotor having a flat annular braking surface, a symmetrical friction member having a rigid backing and a segment of friction material secured thereto, anchoring means providing a slidable bearing surface restraining forward circumferential movement of said friction member and located at the one remote end of said friction member offset from its geometrical center in the direction opposite forward rotor rotation, and actuating means for biasing said friction member laterally against its opposed annular braking surface of said rotor, the location of resultant normal reaction force of said rotor being disposed in circumferential offset relation from the center of applying pressure from said actuating means by a distance "$e$" which has a value in accordance with the relation:

$$e = \mu_1(a - b\mu_2)$$

where:

$\mu_1$ = the coefficient of friction between the rotor and friction material liner;
$a$ = the perpendicular distance between the braking surface of the rotor and the portion of said anchoring means engaged by said friction member;
$b$ = the perpendicular distance between the center of applying pressure and the anchoring surface of said anchoring means; and
$\mu_2$ = the coefficient of friction at the slidable bearing surface between said anchoring means and friction member.

2. A brake comprising a rotor having a flat annular braking surface, a friction member having a surface engageable with said flat annular braking surface, means forming an anchoring abutment for said friction member at the end thereof remote from its geometrical center and in a direction opposite to forward rotation of said rotor, nonrotatable anchoring means located in closely adjacent relation with the braking surface of said rotor and providing a slidable bearing surface for said anchoring abutment to be the sole restraint to circumferential movement of said friction member, nonrotatable mounting means located at the end of said friction member oppositely from its anchor end to be in assistance with said anchoring means for positioning said friction member and to provide an opposing moment to turning of said friction member about said anchoring means, and actuating means for biasing said friction member into frictional engagement with said annular braking surface by effecting slidable movement thereof on its bearing surfaces with said anchoring means and mounting means.

3. A brake as recited in claim 2 wherein said actuating means and friction member are so disposed that the resultant force exerted by said actuating means on said friction member will be slightly offset from the normal reaction force between said rotor surface and the opposed surface of said friction member.

4. A brake comprising a rotor having a flat annular braking surface, a friction member at each side of said rotor and each having a rigid backing and a symmetrical liner of friction material secured thereto, anchoring means providing a slidable bearing surface restraining circumferential movement of said friction members and located at the remote end of each said friction member offset from their geometrical center in the opposite direction of forward rotor rotation, and a fluid motor actuator for each friction member including a piston for biasing its friction member laterally against its opposed annular braking surface of said rotor, the location of resultant normal reaction force of said rotor being disposed in circumferential offset relation from the center of applying pressure from said actuating means by a distance "$e$" which has a value in accordance with the relation:

$$e = \mu_1(a - b\mu_2)$$

where:

$\mu_1$ = the coefficient of friction between the rotor and friction material liner;
$a$ = the distance between the braking surface of the rotor and the surface of said anchoring means engaged by said friction member;
$b$ = the perpendicular distance between the resultant center of pressure and the anchoring surface of said anchoring means; and,
$\mu_2$ = the coefficient of friction at the slidable bearing surface between said anchoring means and friction member.

5. A brake comprising a rotor having a flat annular braking surface, a symmetrical friction member having a surface engageable with said flat annular braking surface, means forming an anchoring abutment for said friction member and disposed at the end thereof remote from its geometrical center in a direction opposite to forward rotation of said rotor, nonrotatable anchoring means located in closely adjacent relation with the braking surface of said rotor and providing a slidable bearing surface for said anchoring abutment to be substantially the sole restraint to circumferential movement of said friction member in both forward and reverse rotation of said rotor, nonrotatable mounting means located at the end of said friction member oppositely from its anchored end to be in assistance with said anchoring means for positioning of said friction member and to provide an opposing moment to turning of said friction member about said anchoring means, and a fluid motor actuator including a fluid pressure responsive piston bearing against said friction member and biasing said friction member into frictional engagement with said annular braking surface by effecting slidable movement thereof on its bearing surfaces with said anchoring means and mounting means, said piston being disposed along the length of said friction member to provide a resultant applying force offset from the geometrical center of the friction member in the direction of forward rotor rotation.

6. A disk brake comprising: a rotor having a flat annular braking surface; a friction member having a surface engageable with said flat annular braking surface; first and second means each forming an anchoring abutment on said friction member; said first anchoring-abutment means being located at the end of said friction member remote from its geometrical center and in a direction opposite to forward rotation of said rotor, and said second anchoring abutment means being located at the other end of said friction member; nonrotatable first and second anchoring means each providing a slidable bearing surface for said first and second anchoring abutment means, respectively; said nonrotatable anchoring means each being located in closely adjacent relation with a braking surface of said rotor; actuating means for biasing said friction member into frictional engagement with said annular braking surface by effecting slidable movement thereof on said bearing surfaces of said anchoring means; said nonrotatable anchoring means and said anchoring abutment means being so disposed in relation to each other that braking during forward rotation of said rotor, said first anchoring means will be the sole restraint to circumferential movement of said friction member and said second nonrotatable anchoring means will assist said first anchoring means for positioning said friction member and to provide an opposing moment to turning of said friction member about said first anchoring means, and braking during reverse rotation of said rotor, said second nonrotatable anchoring means will be the sole restraint of circumferential movement of said friction member and said first nonrotatable anchoring means will assist said second anchoring means for positioning said friction member and to provide an opposing moment to turning of said friction member about said second anchoring means.

7. The structure as recited in claim 2, wherein said means forming an anchoring abutment for said friction member comprises an opening in said friction member and said nonrotatable anchoring means comprises an elongated member extending through said opening.

8. The structure as recited in claim 6, wherein said first and second means each forming an anchoring abutment for said friction member each comprises an opening in said friction member and said first and second nonrotatable anchoring means each comprises an elongated member extending through a respective one of said openings.

References Cited in the file of this patent
UNITED STATES PATENTS 2,862,580   Burnett _____ Dec. 2, 1958

FOREIGN PATENTS 811,525   Great Britain _____ Apr. 8, 1959

UNITED STATES PATENT OFFICE
CERTIFICATE OF CORRECTION

Patent No. 3,119,468                             January 28, 1964

Joseph Lloyd Mossey

It is hereby certified that error appears in the above numbered patent requiring correction and that the said Letters Patent should read as corrected below.

Column 3, about lines 41 and 42, equation (1) should appear as shown below instead of as in the patent:

$$\Sigma F_y = 0$$

column 4, about lines 74 and 75, equation (11) should appear as shown below instead of as in the patent:

$$e = \frac{F_a'(a + b'\mu_2)}{N}$$

Signed and sealed this 11th day of August 1964.

(SEAL)
Attest:

ERNEST W. SWIDER                                  EDWARD J. BRENNER

Attesting Officer                                  Commissioner of Patents